UNITED STATES PATENT OFFICE.

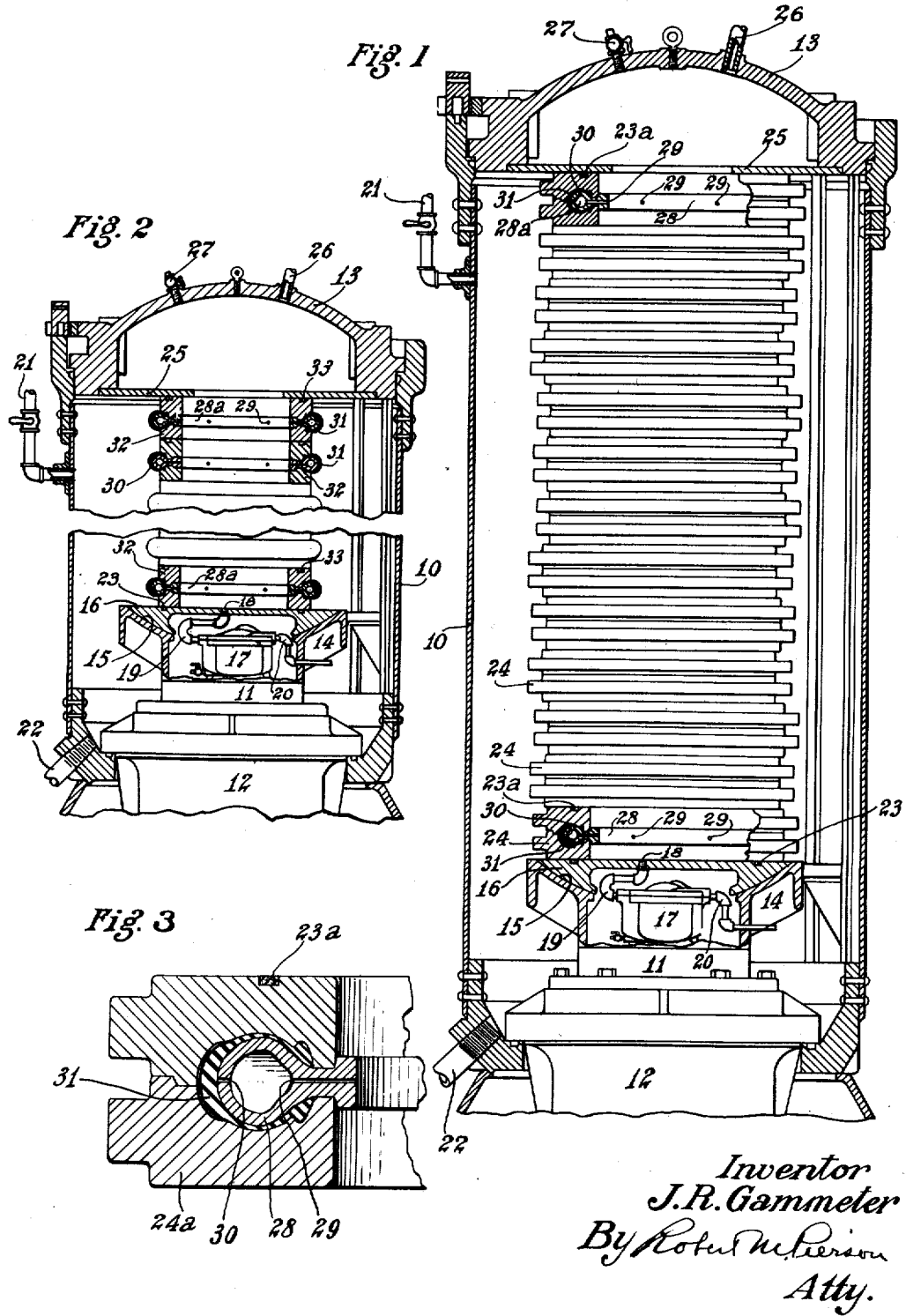

JOHN R. GAMMETER, OF AKRON, OHIO, ASSIGNOR TO THE B. F. GOODRICH COMPANY, OF NEW YORK, N. Y., A CORPORATION OF NEW YORK.

TIRE-VULCANIZING METHOD AND APPARATUS.

1,386,465.  Specification of Letters Patent.  Patented Aug. 2, 1921.

Application filed April 6, 1921. Serial No. 459,045.

*To all whom it may concern:*

Be it known that I, JOHN R. GAMMETER, a citizen of the United States, residing at Akron, in the county of Summit and State of Ohio, have invented a certain new and useful Tire-Vulcanizing Method and Apparatus, of which the following is a specification.

This invention relates to methods and apparatus for vulcanizing or partially vulcanizing pneumatic tire casings or carcasses, by the application of a heat-carrying fluid to the interior of the casings. Heretofore, in the ordinary vulcanization, where the heat is applied to the tire through the outer mold, an imperfect product has sometimes resulted from the distortion or buckling of the fabric due to the flow of the tread rubber under pressure of the mold.

The main objects of my invention are to provide an improved method of vulcanizing, adapted for quantity production, whereby distortion of the fabric conveniently can be avoided by pre-curing the inner parts of the tire, or by expanding the tire before or during vulcanization, and to provide improved vulcanizing means for performing said method, among others. A further object is to prevent the "blowing" or swelling of the rubber during vulcanization due to the expansion of air or gases imprisoned in the rubber.

Of the accompanying drawings:

Figure 1 is a vertical section of a tire vulcanizer or heater-press embodying and adapted to carry out my invention.

Fig. 2 is a similar view showing a modification.

Fig. 3 is a cross-sectional fragmentary view on a large scale of a tire mold, core, and tire, such as are shown in Fig. 1.

Referring to the drawings:

10 is a vertical heater-press, 11 is the ram, 12 is the ram cylinder and 13 is the cover. The ram 11 is provided with a specially designed annular head 14, formed with a spherically concave upper face 15, on which is seated a platform or platen 16 having a flat upper surface and a spherically convex bottom surface adapted to rest upon said head in ball-and-socket relation thereto, said member being formed on its under side with a cavity facing the cavity of the hollow ram head 14. In the latter is mounted, upon the ram 11, a steam trap 17. The platform 16 is formed with a central aperture 18 which is connected by a flexible conduit 19, of pipe and hose, with the inlet of said trap. The outlet pipe 20, of the trap passes through the wall of the hollow ram head 14 and is adapted to discharge into the outer region of the heater-press chamber. The platen 16, being connected with the ram by the ball-and-socket or universal joint and to the steam trap by the flexible connection 19, is adapted to tilt upon the ram head 14 and automatically adjust itself to the molds. 21 is a pipe adapted to supply fluid pressure to the vulcanizing chamber and 22 is an outlet pipe threaded through the base of said chamber and adapted to discharge fluid from the lowermost part thereof.

The platen 16 is formed with a circular groove in its upper face occupied by a gasket 23, adapted to effect a fluid seal between said platform and the lowermost of a stack of annular objects such as tire molds 24, 24 (Fig. 1) supported upon said platen. The upper section of each tire mold 24 is provided on its upper surface with a similar gasket 23ª adapted to effect a fluid seal against the mold next above or, in the case of the uppermost mold, against an annular top platen 25 having a pressure-tight fit in the heater-press cover 13, the stack of molds with the cover 13 and the platform 16 thus forming an inner chamber within the heater-press. 26 is an inlet pipe mounted on the heater-press cover 13 and adapted to supply fluid pressure, through the annular platen 25, to said inner chamber. 27 is a petcock mounted in said cover, adapted to vent said inner chamber. I do not limit my claims, however, to the locations shown for the pipes 21, 22 or 26, or the pet-cock 27.

Referring to Figs. 1 and 3, 28, 28 are tire cores formed with perforations 29, 29 extending through their tongues from their inner peripheries to their interior cavities 28ª, and with other perforations 30, 30 extending through their walls at their outer peripheries, thus placing the inner chamber formed by the mold stack in communication with the inner surfaces of the tires 31, 31, mounted on the cores 28.

In the operation of the device as shown in Figs. 1 and 3, the tires, slightly smaller than the mold cavities, are built upon the cores 28 as in the usual practice. The tires, in which the cores may be left, as shown, are placed in the molds and the latter are stacked upon the platform 16 as shown, the heater-press cover 13 is applied and secured in place as in common practice, and the ram 11 is raised, by the usual hydraulic pressure, pressing the stack of molds between the plate 25 and the platform 16, the latter, by reason of its ball-and-socket relation with the ram head 14, automatically tilting to the extent necessary approximately to equalize the pressure upon all parts of the gaskets 23, 23ᵃ to insure proper sealing of the molds against each other and against the plate 25 and the platform 16. The beads of the tires preferably are of such size relative to the cavities of the molds that the closing of the molds upon them effects a seal between the cores and the molds.

Fluid pressure is then admitted through the pipe 26 to the inner chamber formed by the stack of molds, being communicated through the perforations 29, to the core cavities and from the latter through the perforations 30 to the inner surfaces of the tires to expand the latter against the walls of the mold cavities, stretching the fabric. When steam pressure is used, the heat afforded thereby softens the rubber and thus facilitates the expansion of the tires. If steam meanwhile has not been applied to the chamber outside of the stack of molds, the steam within the tires will first vulcanize the inner plies thereof, but I do not wholly limit my claims to the use of steam to expand the tires nor to applying the heat first to the inner surfaces of the tires. When steam is admitted to the inner chamber, water of condensation is automatically discharged through the trap 17 and its outlet 20 into the outer chamber of the vulcanizer, from which it drains off through the pipe 22.

When the tires have been expanded, by the internal fluid pressure, against the walls of the mold cavities, with or without partial vulcanization according to whether vulcanizing steam pressure is used, steam may be applied to the chamber outside of the molds, through the pipe 21, and the vulcanization thus effected by applying heat to the tires through the molds 24. In order to control the total amount of vulcanization given the inner and outer regions respectively of the tires, steam pressure during all or a part of the operation may be maintained in the outer chamber, or different steam or air pressures may be maintained in the two chambers. Heat sufficient at first to soften only the outer parts of the tires may be applied to the outer chamber, while a relatively high air pressure may be applied to the inner chamber to expand the tire, the relatively cool rubber of the inner plies having little tendency to flow, while the softening of the outer plies facilitates the stretching of the tires. The relative soft condition of the outer plies and stiff condition of the inner plies may be obtained by partially vulcanizing the inner plies, while only warming up the outer plies, and expansion of the tires may be held in abeyance until this condition is reached by maintaining a relatively high air pressure in the outer chamber.

In the modification shown in Fig. 2 the cores 28ᵃ are perforated only at their inner peripheries and bead clamping ring molds 32, 32 are substituted for the full outer molds 24, said rings being adapted to engage the tires only at the beads and provided with gaskets 33, 33 adapted to seal the bead-clamping rings against each other and against the plate 25. The preliminary vulcanization of the inner plies is effected by applying steam to the inner chamber formed by the stack of cores and bead-clamping rings, the steam passing therefrom through the perforations 29 into the annular cavities of the cores and heating the tires through the thin walls of the cores. During this operation, "blowing" of the rubber may be prevented by applying air pressure to the outer chamber. This modification, with the rings clamping only the bead portions of the tires, is adapted for pre-curing tire carcasses before the tread is applied thereto, as well as complete tires. In the modification shown in Fig. 2, after the preliminary vulcanization of the inner plies is effected, as stated, molds may be substituted for the bead-clamping rings 32, and the final vulcanization effected by the usual means, or molds and apparatus such as shown in Fig. 1 may be used and steam at selected pressures may be applied to the outer and inner chambers respectively or steam may be applied to one chamber and compressed air to the other chamber.

Various further modifications may be resorted to without departing from the scope of my invention and I do not limit my claims wholly to the specific construction and procedures shown and described.

I claim:

1. The method of vulcanizing pneumatic tires which comprises the steps of heating and partially vulcanizing the tire from the inside while preventing the blowing of the rubber by applying pressure to the outer surface of the tire, and then heating the tire from the outer side to further vulcanize it.

2. The method of vulcanizing pneumatic tires which comprises the steps of heating and partially vulcanizing the tire from the inside only while the tread portion is free from mold pressure, and subsequently applying mold pressure to said tread portion.

3. The method of vulcanizing pneumatic tires which comprises holding the tire against expansion by applying fluid under pressure to the outer surface of the tire while applying a heating fluid to the space within the tire, and subsequently expanding the tire by fluid pressure.

4. The method of vulcanizing pneumatic tires which comprises introducing a heating fluid into the space within the tire while preventing blowing of the rubber by applying a fluid under pressure to the outer surface of the tire.

5. The method of vulcanizing pneumatic tires which comprises assembling a plurality of tires substantially in axially alined relation and sealing the interstices between successive tires to form a chamber, and applying fluid pressure to said chamber and heat to said tires.

6. The method of vulcanizing pneumatic tires which comprises assembling a plurality of tires substantially in axially alined relation and sealing the interstices between successive tires to form a chamber, applying differential fluid pressures to the interior and exterior respectively of said chamber, and applying heat to said tires.

7. The method of vulcanizing pneumatic tires which comprises assembling a plurality of tires substantially in axially alined relation and sealing the interstices between successive tires to form a chamber, applying different fluids under pressure to the interior and exterior respectively of said chamber and applying heat to said tires.

8. The method of vulcanizing pneumatic tires which comprises assembling a plurality of tires substantially in axially alined relation and sealing the interstices between successive tires to form a chamber, and applying steam to the interior and compressed air to the exterior of said chamber.

9. The method of vulcanizing pneumatic tires which comprises assembling a plurality of tires substantially in axially alined relation and sealing the interstices between successive tires to form a chamber, and applying different degrees of heat to the interior and exterior respectively of said tires.

10. The method of vulcanizing pneumatic tires which comprises assembling a plurality of tires substantially in axially alined relation and sealing the interstices between successive tires to form a chamber communicating with the inner surfaces of said tires, expanding said tires by applying fluid pressure to said chamber, and applying heat to said tires.

11. The method of vulcanizing pneumatic tires which comprises assembling a plurality of tires substantially in axially alined relation and sealing the interstices between successive tires to form a chamber communicating with the inner surfaces of said tires, and applying steam to said chamber.

12. The method of vulcanizing pneumatic tires which comprises assembling a plurality of tires substantially in axially-alined relation and sealing the interstices between successive tires to form a chamber communicating with the inner surfaces of said tires, and applying steam to said chamber while applying compressed air to the exterior thereof.

13. The method of vulcanizing pneumatic tires which comprises assembling a plurality of tires substantially in axially alined relation and sealing the interstices between successive tires to form a chamber, and applying steam first to the interior of said chamber and subsequently to the exterior thereof.

14. The method of vulcanizing pneumatic tires which comprises assembling a plurality of tire-containing molds substantially in axially alined and sealed relation to form a chamber, applying differential fluid pressure to the interior and exterior respectively of said chamber, and applying heat to said tires.

15. The method of vulcanizing pneumatic tires which comprises assembling a plurality of tire-containing molds substantially in axially alined and sealed relation to form a chamber, applying a hot fluid under pressure to the interior of said chamber, and applying a different fluid under pressure to the exterior thereof.

16. The method of vulcanizing pneumatic tires which comprises assembling a plurality of tire-containing molds substantially in axially alined and sealed relation to form a chamber, and applying different degrees of heat and fluid pressure to the interior and exterior respectively of said chamber.

17. The method of vulcanizing pneumatic tires which comprises assembling a plurality of tire-containing molds substantially in axially alined and sealed relation to form a chamber communicating with the inner surfaces of said tires, expanding said tires by applying fluid pressure to said chamber, and applying heat to said tires.

18. The method of vulcanizing pneumatic tires which comprises assembling a plurality of tire-containing molds substantially in axially alined and sealed relation to form a chamber communicating with the interior surfaces of said tires, applying a heating fluid to said chamber while preventing expansion of the tires by applying a pressure fluid to the exterior of said chamber, and subsequently expanding said tires by fluid pressure.

19. The method of vulcanizing pneumatic tires which comprises assembling a plurality of tire-containing molds substantially in axially alined and sealed relation to form a chamber, and applying steam first to the interior of said chamber and subsequently to the exterior thereof.

20. Apparatus for vulcanizing tires comprising a plurality of mold members adapted to be assembled substantially in alinement to form a chamber, closure members for the ends of said chamber, and means for holding said closure members in closing position.

21. Apparatus for vulcanizing tires comprising a plurality of mold members adapted to be assembled substantially in alinement to form a chamber, closure members for the ends of said chamber, and means for holding said closure members in closing position, said means comprising a ram and a platform connected with said ram by a universal joint.

22. Apparatus for vulcanizing tires comprising a plurality of mold-members adapted to be assembled in stacked relation to form a chamber, sealing members between said mold-members, a ram adapted to support said mold-members, and a steam trap carried by said ram for draining said chamber.

23. In vulcanizing apparatus for pneumatic tires, the combination of a plurality of hollow tire cores having perforated walls and tongues, tire molds inclosing said cores and assembled substantially in axially alined and sealed relation to form a chamber, and means for closing the ends of said chamber.

24. Apparatus for vulcanizing pneumatic tires in molds, said apparatus comprising a heater-press, a ram therein, and a platform connected with said ram by a universal joint for equalizing the ram pressure on different parts of the molds.

25. Vulcanizing apparatus for pneumatic tires comprising a heater-press, a ram therein, a mold operated by the ram and forming a chamber, means for supplying steam to said chamber, and a steam trap carried by said ram for draining said chamber.

26. Vulcanizing apparatus for pneumatic tires comprising a heater-press, a ram therein having a hollow head, a tire mold forming a central chamber, a platform supporting said mold and supported upon said ram head by a universal joint, and a steam trap in said ram head having its inlet conduit traversing the platform for draining said chamber.

27. In vulcanizing apparatus for pneumatic tires, the combination of a heater-press, a plurality of hollow cores formed with perforated tongues, annular members adapted to press the bead portions of the tires against said cores and to be assembled therewith in stacked relation to form an inner chamber within the heater-press, means for sealing off the ends of said inner chamber from the outer regions of the heater-press, and independent means for applying fluid pressure respectively to said inner chamber and to said outer regions.

28. In vulcanizing apparatus for pneumatic tires the combination of a heater-press, a ram therein, a plurality of hollow cores having perforated walls and tongues, tire molds adapted to inclose tires mounted on said cores and to be assembled in stacked relation upon the ram to form an inner chamber within the heater press, means for sealing off the top of said inner chamber from the outer regions of the heater-press, and independent means for supplying fluid pressure respectively to said inner chamber and said outer regions.

29. In vulcanizing apparatus for pneumatic tires, the combination of a heater-press, a ram therein, a platform connected by a universal joint with said ram, a plurality of hollow tire cores having perforated tongues, annular members adapted sealingly to press the bead portions of tires mounted on said cores and to be assembled therewith in stacked relation to form an inner chamber within the heater-press, a plate sealingly secured to the base of the heater-press cover, gaskets adapted to seal said annular members against each other and against said plate and said platform, and means for applying fluid pressure to said inner chamber.

30. In vulcanizing apparatus for pneumatic tires the combination of tire cores, annular members adapted sealingly to press the bead portions of the tires against said cores and to be assembled therewith in stacked relation to form a chamber, and means for sealing said annular members against each other.

In witness whereof I have hereunto set my hand this 31st day of March, 1921.

JOHN R. GAMMETER.

DISCLAIMER.

1,386,465.—*John R. Gammeter*, Akron, Ohio. TIRE-VULCANIZING METHOD AND APPARATUS. Patent dated August 2, 1921. Disclaimer filed October 8, 1924, by the assignee, *The B. F. Goodrich Company*.

Hereby enters this disclaimer to the subject matter of the following claims of said patent, to wit:

"1. The method of vulcanizing pneumatic tires which comprises the steps of heating and partially vulcanizing the tire from the inside while preventing the blowing of the rubber by applying pressure to the outer surface of the tire, and then heating the tire from the outer side to further vulcanize it.

"2. The method of vulcanizing pneumatic tires which comprises the steps of heating and partially vulcanizing the tire from the inside only while the tread portion is free from mold pressure, and subsequently applying mold pressure to said tread portion.

"4. The method of vulcanizing pneumatic tires which comprises introducing a heating fluid into the space within the tire while preventing blowing of the rubber by applying a fluid under pressure to the outer surface of the tire."

[*Official Gazette October 28, 1924.*]